(12) United States Patent
Jhu et al.

(10) Patent No.: US 12,149,746 B2
(45) Date of Patent: Nov. 19, 2024

(54) METHODS AND APPARATUS OF VIDEO CODING USING PALETTE MODE

(71) Applicant: BEIJING DAJIA INTERNET INFORMATION TECHNOLOGY CO., LTD., Beijing (CN)

(72) Inventors: Hong-Jheng Jhu, Beijing (CN); Yi-Wen Chen, Beijing (CN); Xiaoyu Xiu, Beijing (CN); Xianglin Wang, Beijing (CN); Tsung-Chuan Ma, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 17/861,093

(22) Filed: Jul. 8, 2022

(65) Prior Publication Data

US 2022/0353540 A1    Nov. 3, 2022

Related U.S. Application Data

(63) Continuation of application No. PCT/US2021/012964, filed on Jan. 11, 2021.

(Continued)

(51) Int. Cl.
*H04N 19/70* (2014.01)
*H04N 19/169* (2014.01)
(Continued)

(52) U.S. Cl.
CPC ........... *H04N 19/70* (2014.11); *H04N 19/176* (2014.11); *H04N 19/186* (2014.11); *H04N 19/1883* (2014.11); *H04N 19/46* (2014.11)

(58) Field of Classification Search
CPC .. H04N 19/176; H04N 19/186; H04N 19/157; H04N 19/159; H04N 19/96;
(Continued)

(56) References Cited

U.S. PATENT DOCUMENTS

| | | |
|---|---|---|
| 2015/0003518 A1 | 1/2015 | Nguyen et al. |
| 2015/0341655 A1 | 11/2015 | Joshi et al. |

(Continued)

FOREIGN PATENT DOCUMENTS

| | | |
|---|---|---|
| CN | 105359521 A | 2/2016 |
| CN | 106471805 A | 3/2017 |

(Continued)

OTHER PUBLICATIONS

Chao et al. "CE8-2.1: Palette mode in HEVC" Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0119. (Year: 2019).*

(Continued)

*Primary Examiner* — Nathnael Aynalem
(74) *Attorney, Agent, or Firm* — MASCHOFF BRENNAN; Liang Huang

(57) ABSTRACT

An electronic apparatus performs a method of decoding video data. The method comprises: receiving, from bitstream, a plurality of syntax elements associated with a coding unit, wherein the plurality of syntax elements indicate a size of the coding unit and a coding tree type of the coding unit; determining a minimum palette mode block size for the coding unit in accordance with the coding tree type of the coding unit; in accordance with a determination that the size of the coding unit is greater than the minimum palette mode block size: receiving, from the bitstream, a palette mode enable flag associated with the coding unit; and (Continued)

decoding, from the bitstream, the coding unit in accordance with the palette mode enable flag.

18 Claims, 13 Drawing Sheets

Related U.S. Application Data

(60) Provisional application No. 62/959,913, filed on Jan. 11, 2020.

(51) Int. Cl.
  *H04N 19/176* (2014.01)
  *H04N 19/186* (2014.01)
  *H04N 19/46* (2014.01)

(58) Field of Classification Search
  CPC ...... H04N 19/119; H04N 19/11; H04N 19/70; H04N 19/593; H04N 19/132; H04N 19/105; H04N 19/103; H04N 19/1883; H04N 19/174; H04N 19/503; H04N 19/136; H04N 19/46; H04N 19/61; H04N 19/107; H04N 19/109; H04N 19/197; H04N 9/64; H04N 19/184; H04N 19/50; H04N 19/122; H04N 19/124; H04N 19/18; H04N 19/12; H04N 19/134; H04N 19/137; H04N 19/44; H04N 19/60; H04N 19/625; H04N 19/91
  USPC ........................................ 375/240.01–240.29
  See application file for complete search history.

(56) References Cited

U.S. PATENT DOCUMENTS

| | | | |
|---|---|---|---|
| 2016/0234494 A1* | 8/2016 | Seregin | H04N 19/176 |
| 2016/0360198 A1 | 12/2016 | Chang et al. | |
| 2017/0195676 A1 | 7/2017 | Chuang et al. | |
| 2019/0246122 A1 | 8/2019 | Zhang et al. | |
| 2021/0203953 A1* | 7/2021 | Sarwer | H04N 19/70 |

FOREIGN PATENT DOCUMENTS

| | | |
|---|---|---|
| CN | 106716999 A | 5/2017 |
| CN | 106797478 A | 5/2017 |
| CN | 107005717 A | 8/2017 |
| CN | 109479137 A | 3/2019 |
| EP | 3104606 A1 | 12/2016 |
| JP | 2017522804 A | 8/2017 |
| KR | 20170116026 A | 10/2017 |

OTHER PUBLICATIONS

Beijing Dajia Internet Information Technology Co. Ltd., International Search Report and Written Opinion, PCT/US2021/012964, Apr. 29, 2021, 8 pgs.
Hong-Jheng Jhu, "CE8-related: Palette mode excluding small blocks," Joint Video Experts Team (JVET) of ITU-T SG 16 WP3 and ISO/IEC JTC 1/SC 29/WG 11, Document: JVET-O0600, 15th Meeting, Gothenburg, SE, Jul. 3-12, 2019, 4 pgs.
Hua Yang, "Non-CE8: Palette mode CU size restriction," Joint Video Experts Team (JVET) of ITU-T SG 16 WP 3 and ISO/IEC JTC 1/SC 29/WG 11, Document: JVET-P0375, 16th Meeting: Geneva, CH, Oct. 1-11, 2019, 5 pgs.
Benjamin Bross et al., "Versatile Video Coding (Draft 9)", Document: JVET-R2001-vB, Joint Video Experts Team (JVET) of ITU-T SG 16 WP 3 and ISO/IEC JTC 1/SC 29/WG 11, 18th Meeting: by teleconference, Apr. 15-24, 2020, 523 pgs.
Hua Yang, "Non-CE8: Palette mode CU size restriction," Joint Video Experts Team (JVET) of ITU-T SG 16 WP 3 and ISO/IEC JTC 1/SC 29/WG 11, Document: JVET-P0375, 16th Meeting: Geneva, CH, Oct. 1-11, 2019, 6 pgs.
Kwai Inc., Jhu et al., "CE2-related: Palette mode excluding small blocks", Document: JVET-Q0629, Joint Video Experts Team (JVET) of ITU-T SG 16 WP 3 and ISO/IEC JTC 1/SC 29/WG 11,17th Meeting: Brussels, BE, Jan. 7-17, 2020, 2 pgs.
Kwai Inc., Jhu et al., "CE2-related: Palette mode excluding small blocks", Document: JVET-Q0629—Spec change for Q0629 and Q0504, Joint Video Experts Team (JVET) of ITU-T SG 16 WP 3 and ISO/IEC JTC 1/SC 29/WG 11,17th Meeting: Brussels, BE, Jan. 7-17, 2020, 4 pgs.
Sullivan et al., "Meeting Report of the 17th Meeting of the Joint Video Experts Team (JVET), Brussels, BE, Jan. 7-17, 2020", Document: JVET-Q2000-v1, Joint Video Experts Team (JVET) of ITU-T SG 16 WP 3 and ISO/IEC JTC 1/SC 29/WG 11, 17th Meeting: Brussels, BE, Jan. 7-17, 2020, 378 pgs.
Bross et al., "Versatile Video Coding (Draft 7)", Document: JEVT-P2001-vE, Joint Video Experts Team (JVET) of ITU-T SG 16 WP 3 and ISO/IEC JTC 1/SC 29/1WG 11, 16th Meeting, Geneva, CH. 1, Oct. 11, 2019, 489 pgs.
CE8-related: Palette mode excluding small blocks, 7.3.2.3. Sequence parameter set RBSP syntax, saved Jun. 22, 2019, 15 pgs.
Hong-Jheng Jhu, "CE8-related: Palette mode excluding small blocks," Joint Video Experts Team (JVET) of ITU-T SG 16 WP3 and ISO/IEC JTC 1/SC 29/WG 11, Document: JVET-O0600, 15th Meeting, Gothenburg, SE, Jul. 3-12, 2019, 5 pgs.

* cited by examiner

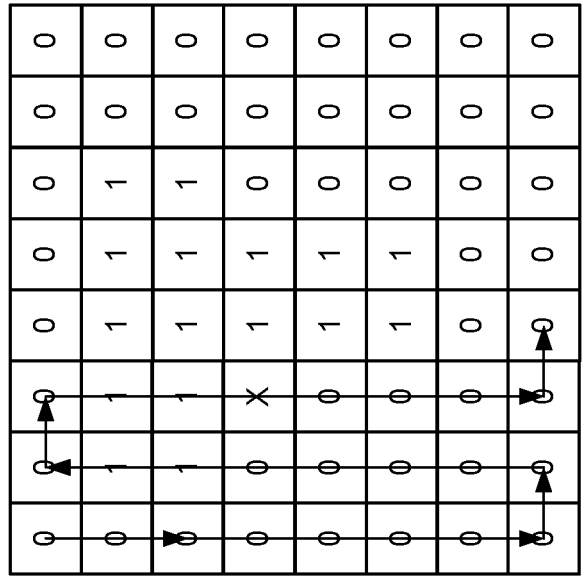
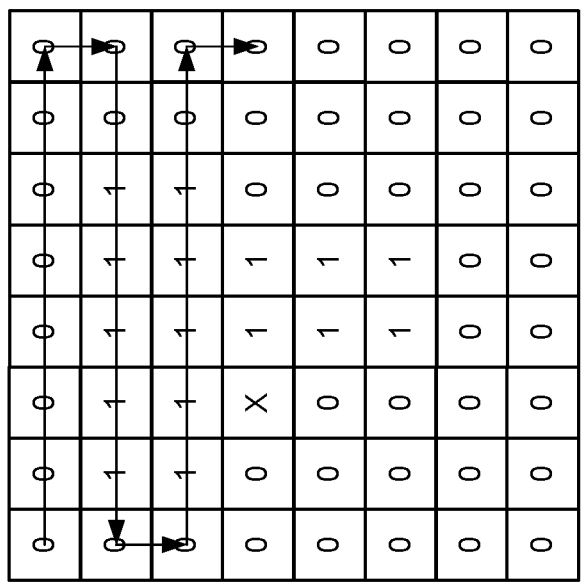
FIG. 5C

600 receiving, from bitstream, a plurality of syntax elements associated with a coding unit, wherein the plurality of syntax elements indicate a size of the coding unit and a coding tree type of the coding unit 610

↓ determining a minimum palette mode block size for the coding unit in accordance with the coding tree type of the coding unit 620

↓ in accordance with a determination that the size of the coding unit is greater than the minimum palette mode block size 630 receiving, from the bitstream, a palette mode enable flag associated with the coding unit 640

↓ decoding, from the bitstream, the coding unit in accordance with the palette mode enable flag 650 when the palette mode enable flag indicates that palette mode is enabled for the coding unit: 660 generating, from the bitstream, a palette table for the current unit 670

↓ decoding, from the bitstream, the coding unit using the generated palette table 680

FIG. 6

METHODS AND APPARATUS OF VIDEO CODING USING PALETTE MODE

CROSS-REFERENCE TO RELATED APPLICATIONS

The present application is a continuation of International Application No. PCT/US2021/012964, entitled "METHODS AND APPARATUS OF VIDEO CODING USING PALETTE MODE", filed on Jan. 11, 2021, which claims priority to U.S. Provisional Patent Application No. 62/959,913, entitled "VIDEO CODING USING PALETTE MODE" filed Jan. 11, 2020, both of which are incorporated by reference in their entirety.

TECHNICAL FIELD

The present application generally relates to video data coding and compression, and in particular, to method and system of video coding using palette mode.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method of video encoding and decoding using palette mode.

According to a first aspect of the present application, a method of decoding video data includes receiving, from bitstream, a plurality of syntax elements associated with a coding unit, wherein the plurality of syntax elements indicate a size of the coding unit and a coding tree type of the coding unit; determining a minimum palette mode block size for the coding unit in accordance with the coding tree type of the coding unit; in accordance with a determination that the size of the coding unit is greater than the minimum palette mode block size: receiving, from the bitstream, a palette mode enable flag associated with the coding unit; and decoding, from the bitstream, the coding unit in accordance with the palette mode enable flag.

According to a second aspect of the present application, an electronic apparatus includes one or more processing units, memory and a plurality of programs stored in the memory. The programs, when executed by the one or more processing units, cause the electronic apparatus to perform the method of decoding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are

FIGS. 5A through 5D are block diagrams illustrating examples of using a palette tables for coding video data in accordance with some implementations of the present disclosure.

FIG. 6 is a flowchart illustrating an exemplary process by which a video decoder implements the techniques of decoding video data in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
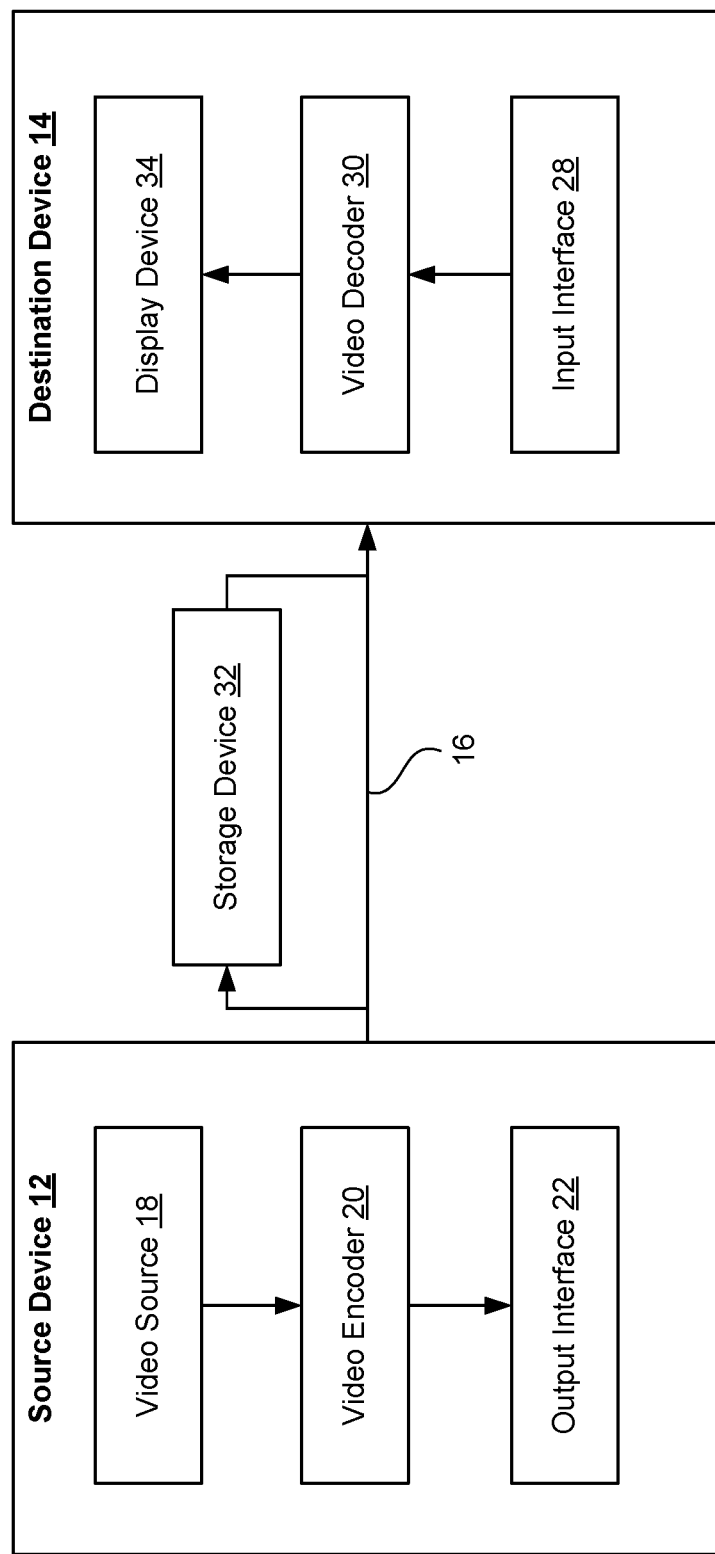
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
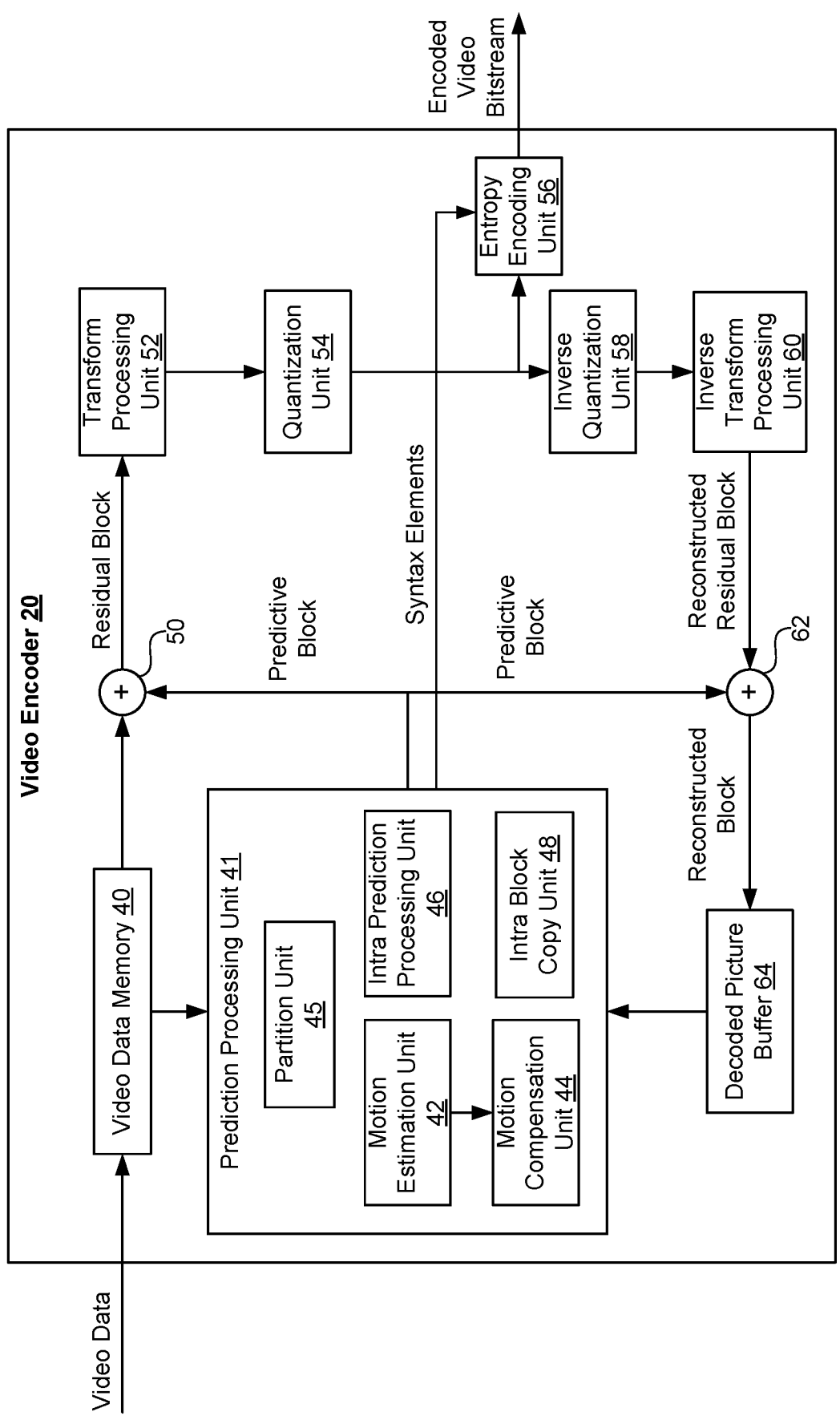
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
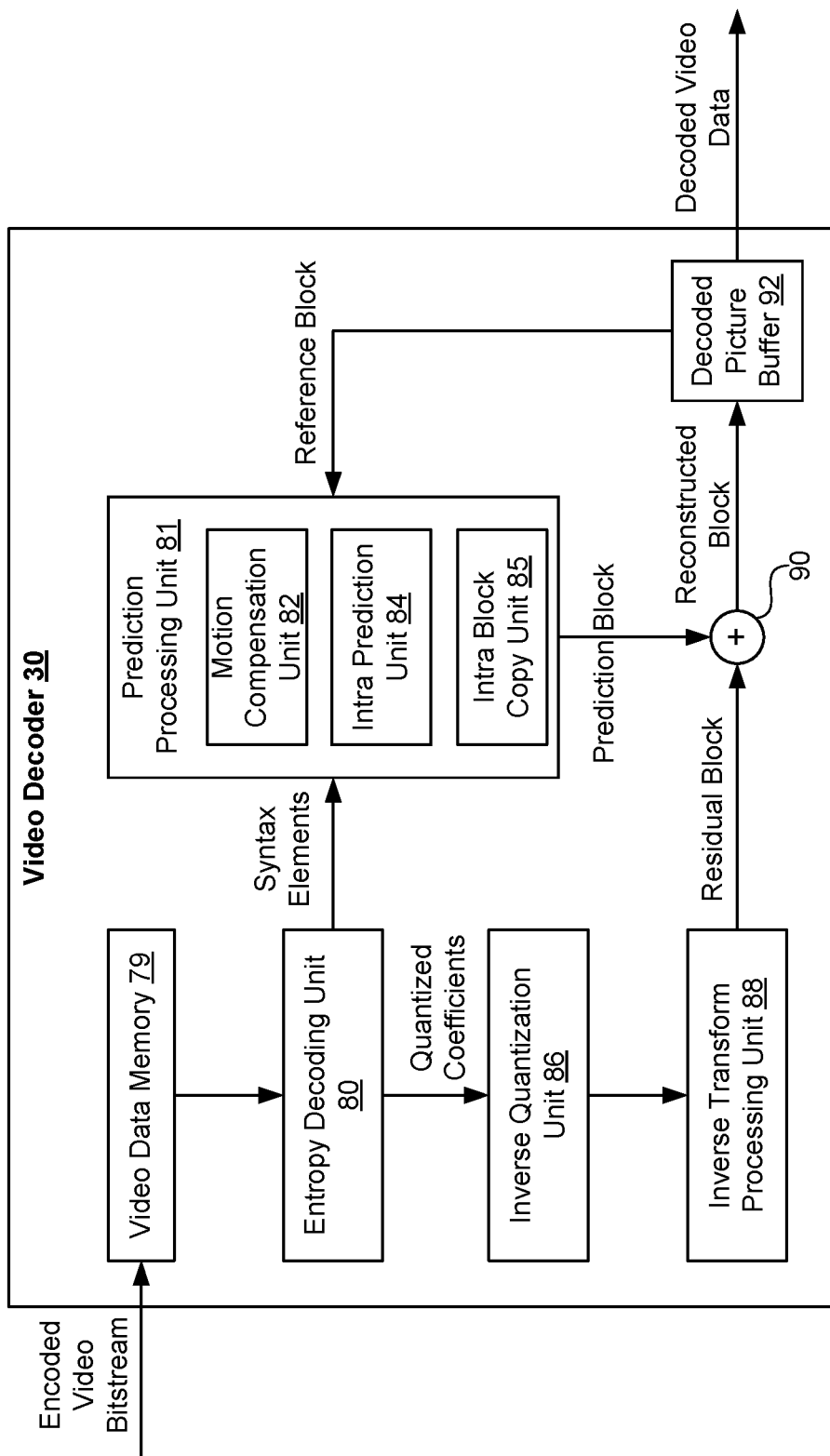
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
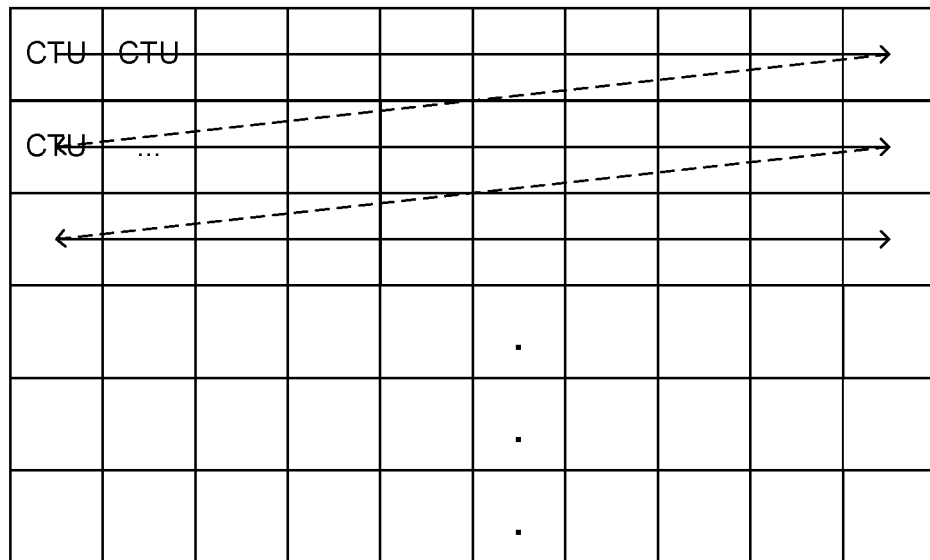
FIGS. 4A through 4E are block diagrams illustrating how a frame is recursively partitioned into multiple video blocks of different sizes and shapes in accordance with some implementations of the present disclosure.
Figure 4B:
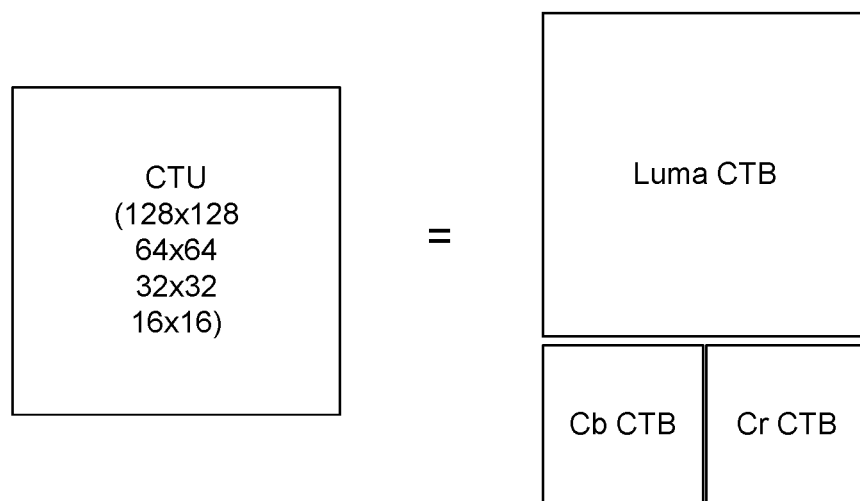

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
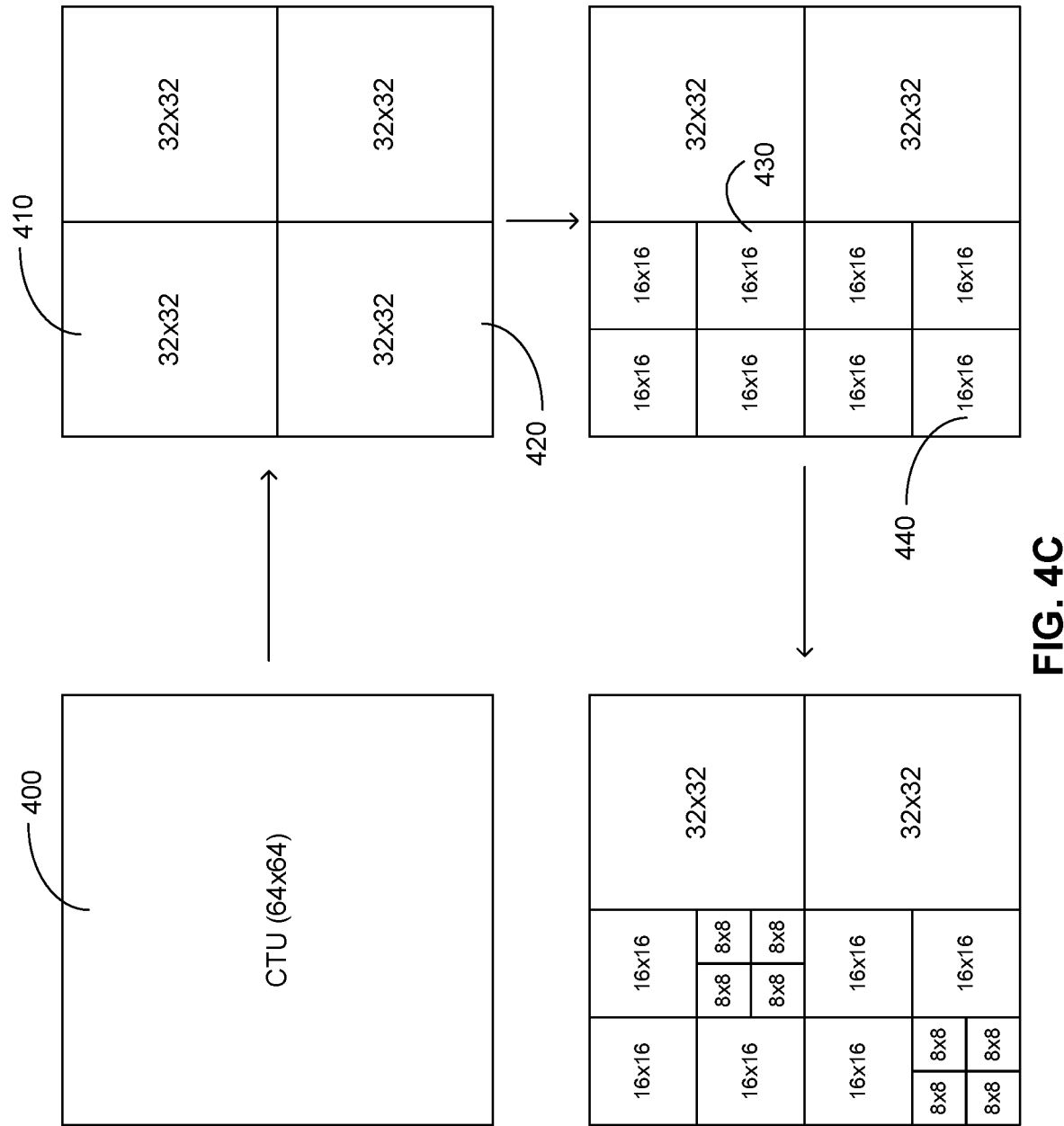
Figure 4D:
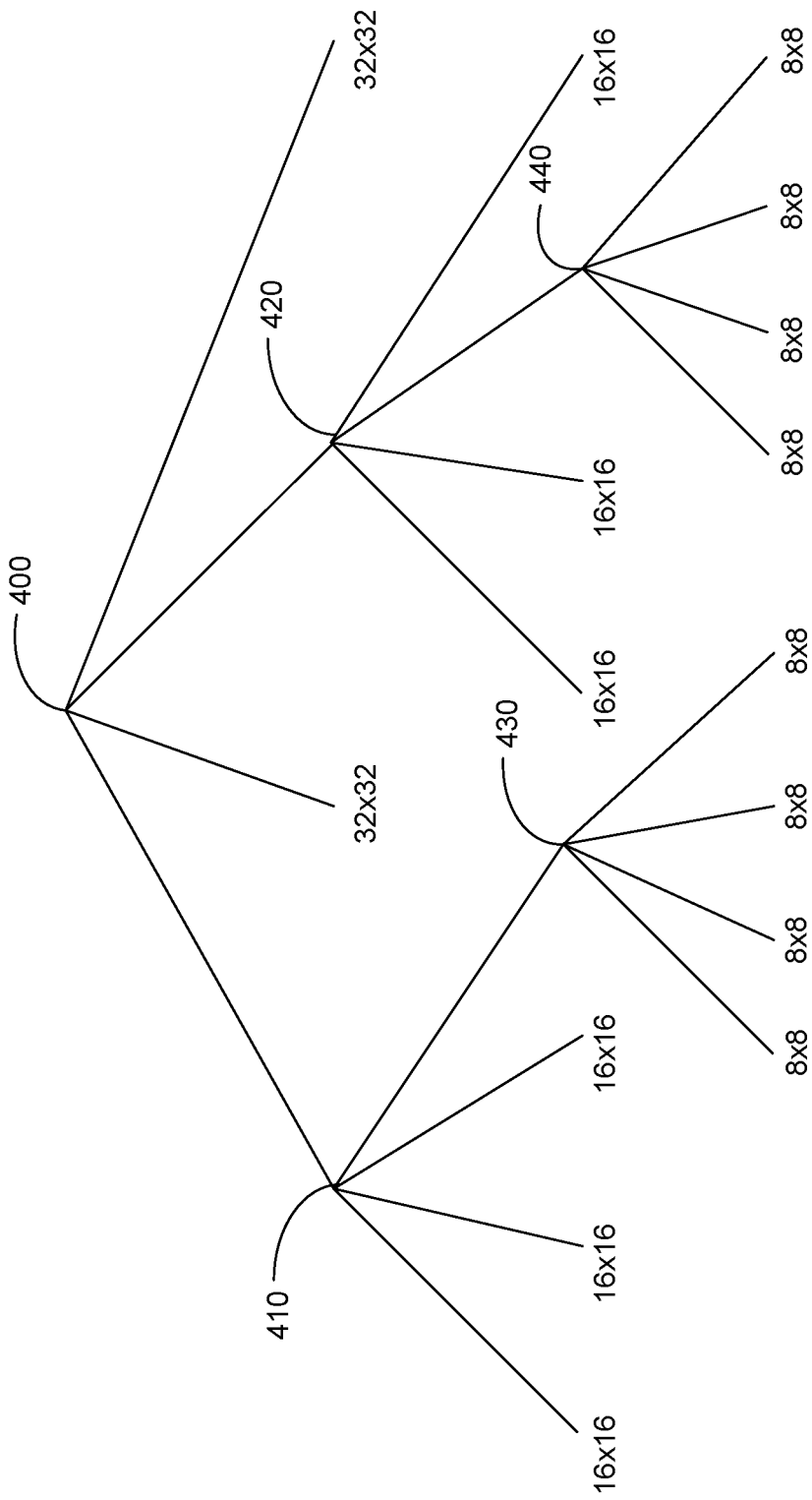
Figure 4E:
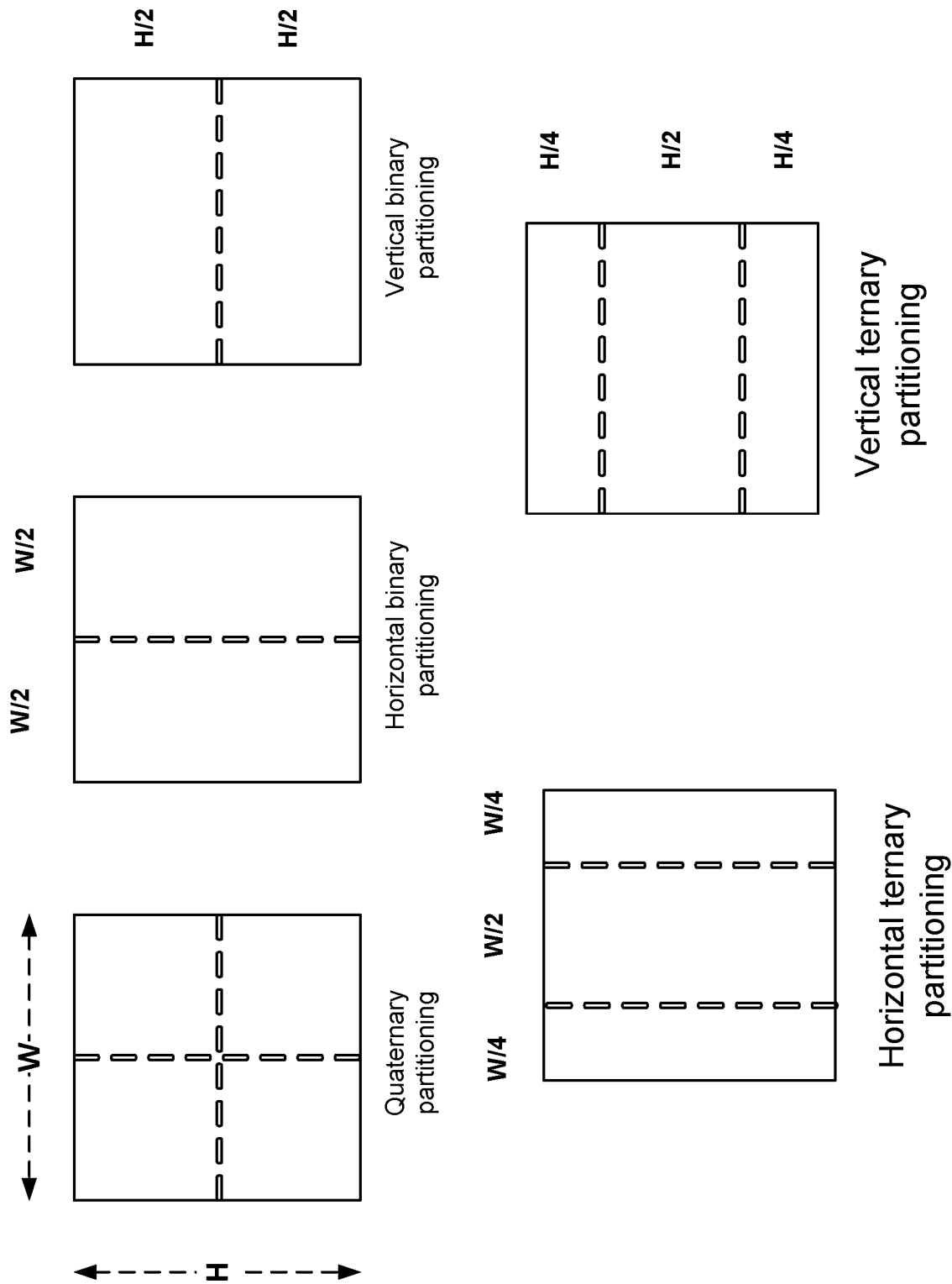

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5A:
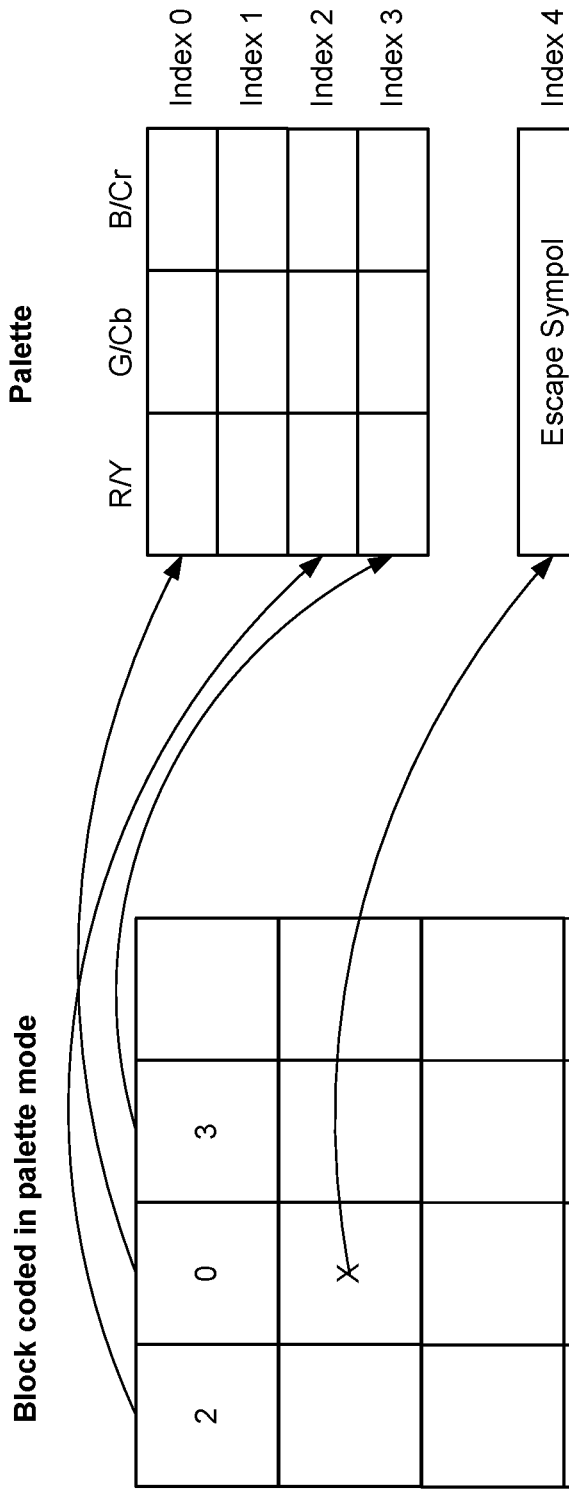
Figure 5B:
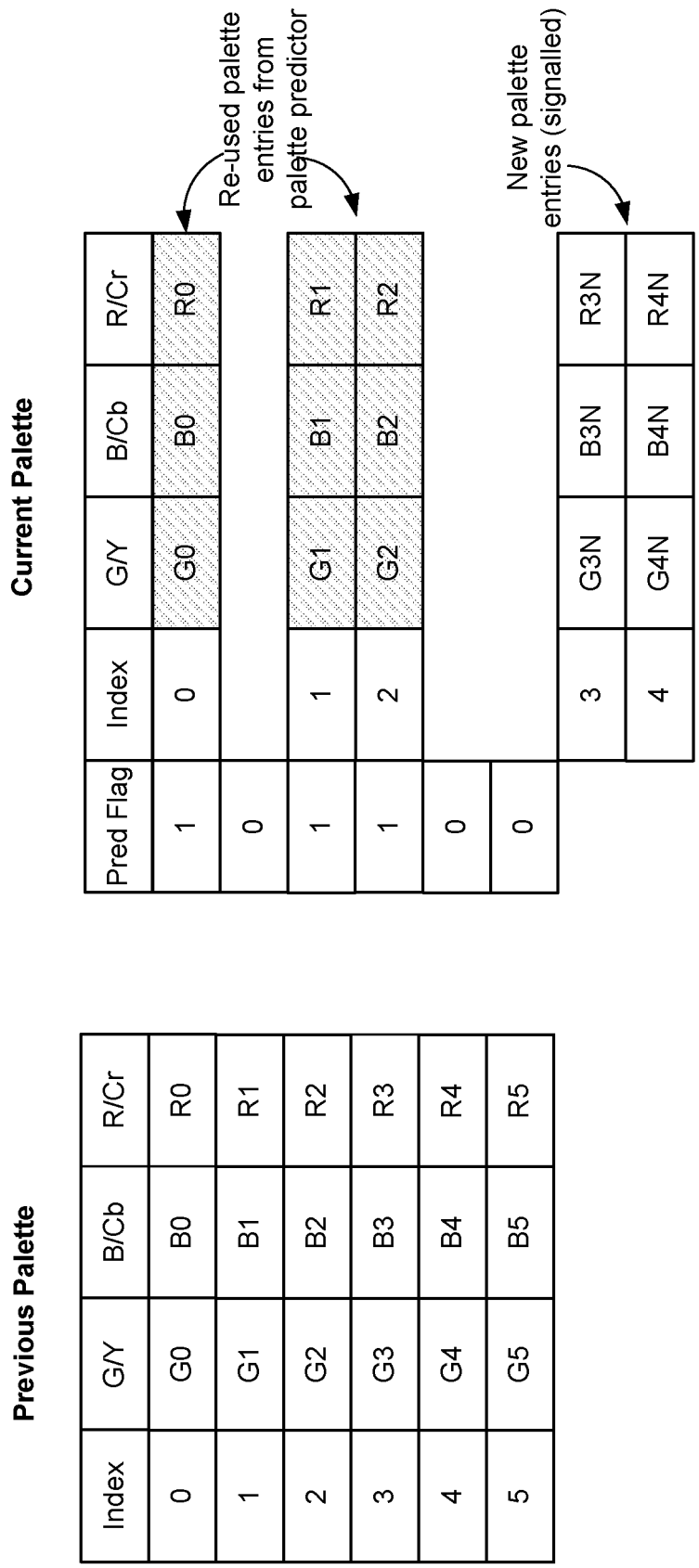

FIGS. 5A through 5B are block diagrams illustrating examples of using palette tables for coding video data in accordance with some implementations of the present disclosure.

For palette (PLT) mode signaling, the palette mode is coded as a prediction mode for a coding unit, i.e., the prediction modes for a coding unit can be MODE_INTRA, MODE_INTER, MODE_IBC and MODE_PLT. If the palette mode is utilized, the pixels values in the CU are represented by a small set of representative colors. The set is referred to as the palette. For pixels with values close to the palette colors, the palette indices are signaled. For pixels with values outside the palette, the pixels are denoted with an escape symbol and the quantized pixel values are signaled directly. The syntax and the associated semantic of the palette mode in current VVC draft specification is illustrated in Table 1 and Table 2 below, respectively.

To decode a palette mode encoded block, the decoder needs to decode palette colors and indices from the bitstream. Palette colors are defined by a palette table and encoded by the palette table coding syntax (e.g., palette_predictor_run, num_signaled_palette_entries, new_palette_entries). An escape flag, palette_escape_val_present_flag, is signaled for each CU to indicate if escape symbols are present in the current CU. If escape symbols are present, the palette table is augmented by one more entry and the last index is assigned to the escape mode. Palette indices of all pixels in a CU form a palette index map and are encoded by the palette index map coding syntax (e.g., num_palette_indices_minus1, palette_idx_idc, copy_above_indices_for_final_run_flag, palette_transpose_flag, copy_above_palette_indices_flag, palette_run_prefix, palette_run_suffix). An example of palette mode coded CU is illustrated in FIG. 5A in which the palette size is 4. The first 3 samples in the CU use palette entries 2, 0, and 3, respectively, for reconstruction. The "x" sample in the CU represents an escape symbol. A CU level flag, palette_escape_val_present_flag, indicates whether any escape symbols are present in the CU. If escape symbols are present, the palette size is augmented by one and the last index is used to indicate the escape symbol. Thus, in FIG. 5A, index 4 is assigned to the escape symbol.

If a palette index (e.g., index 4 in FIG. 5A) corresponds to the escape symbol, additional overhead are signaled to indicate the corresponding colors of the sample.

In some embodiments, on the encoder side, it is necessary to derive an appropriate palette to be used with the CU. For the derivation of the palette for lossy coding, a modified k-means clustering algorithm is used. The first sample of the block is added to the palette. Then, for each subsequent sample from the block, the sum of absolute difference (SAD) between the sample and each of the current palette color is calculated. If the distortion for each of the components is less than a threshold value for the palette entry corresponding to the minimum SAD, the sample is added to the cluster belonging to the palette entry. Otherwise, the sample is added as a new palette entry. When the number of samples mapped to a cluster exceeds a threshold, a centroid for that cluster is updated and becomes the palette entry of that cluster.

In the next step, the clusters are sorted in a descending order of usage. Then, the palette entry corresponding to each entry is updated. Normally, the cluster centroid is used as the palette entry. But a rate-distortion analysis is performed to analyze whether any entry from the palette predictor may be more suitable to be used as the updated palette entry instead of the centroid when the cost of coding the palette entries is taken into account. This process is continued till all the clusters are processed or the maximum palette size is reached. Finally, if a cluster has only a single sample and the corresponding palette entry is not in the palette predictor, the sample is converted to an escape symbol. Additionally, duplicate palette entries are removed and their clusters are merged.

After palette derivation, each sample in the block is assigned the index of the nearest (in SAD) palette entry. Then, the samples are assigned to 'INDEX' or 'COPY_ABOVE' mode. For each sample for which either 'INDEX' or 'COPY_ABOVE' mode is possible, the run for each mode is determined. Then, the cost of coding the mode is calculated. The mode for which the cost is lower is selected.

For coding of the palette table, a palette predictor is maintained. The maximum size of the palette and the maximum size of the palette predictor can both signaled in the SPS (or other coding levels such as PPS, slice header, etc.). The palette predictor is initialized at the beginning of each slice where the palette predictor is reset to 0. For each entry in the palette predictor, a reuse flag is signaled to indicate whether it is part of the current palette. As shown in FIG. 5B, the reuse flags, palette_predictor_run, are sent. After this, the number of new palette entries are signaled using exponential Golomb code of order 0 through the syntax num_signaled_palette_entries. Finally, the component values for the new palette entries, new_palette_entries[ ], are signaled. After coding the current CU, the palette predictor is updated using the current palette, and entries from the previous palette predictor which are not reused in the current palette will be added at the end of new palette predictor until the maximum size allowed is reached.

For coding the palette index map, the indices are coded using horizontal or vertical traverse scans as shown in FIG. 5C. The scan order is explicitly signaled in the bitstream using the palette_transpose_flag.

The palette indices are coded using two main palette sample modes: 'INDEX' and 'COPY_ABOVE'. In the 'INDEX' mode, the palette index is explicitly signaled. In the 'COPY_ABOVE' mode, the palette index of the sample in the row above is copied. For both 'INDEX' and 'COPY_ABOVE' modes, a run value is signaled which specifies the number pixels that are coded using the same mode. The mode is signaled using a flag except for the top row when horizontal scan is used or the first column when the vertical scan is used, or when the previous mode was 'COPY_ABOVE'.

In some embodiments, the coding order for index map is as follows: First, the number of index values for the CU is signaled using the syntax num_palette_indices_minus1, which is followed by signalling of the actual index values for the entire CU using the syntax palette_idx_idc. Both the number of indices as well as the index values are coded in bypass mode. This groups the index-related bypass-coded bins together. Then the palette mode (INDEX or COPY_ABOVE) and run are signaled in an interleaved manner using the syntax copy_above_palette_indices_flag, palette_run_prefix and palette_run_suffix. copy_above_palette_indices_flag is a context coded flag (only one bin), the codewords of palette_run_prefix is determined through the process described in Table 3 below and the first 5 bins are context coded. palette_run_suffix is coded as bypass bin. Finally, the component escape values corresponding to the escape samples for the entire CU are grouped together and coded in the bypass mode. An additional syntax element, copy_above_indices_for_final_run_flag, is signaled after signalling the index values. This syntax element, in conjunction with the number of indices, eliminates the need to signal the run value corresponding to the last run in the block.

In the reference software of VVC (VTM), dual tree is enabled for I-slice which separate the coding unit partitioning for luma and chroma components. As a result, palette is applied on luma (Y component) and chroma (Cb and Cr components) separately. If dual tree is disabled, palette will be applied on Y, Cb, Cr components jointly.

TABLE 1

Syntax of palette coding

| | Descriptor |
|---|---|
| palette_coding( x0, y0, cbWidth, cbHeight, startComp, numComps ) { | |
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|     !palettePredictionFinished && | |
|     NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signaled_palette_entries | ae(v) |
|   for( cIdx = startComp; cIdx < ( startComp + numComps); cIdx++ ) | |
|     for( i = 0; i < num_signaled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     num_palette_indices_minus1 | ae(v) |
|     adjust = 0 | |
|     for( i = 0; i <= num_palette_indices_minus1; i++ ) { | |
|       if( MaxPaletteIndex − adjust > 0 ) { | |
|         palette_idx_idc | ae(v) |
|         PaletteIndexIdc[ i ] = palette_idx_idc | |
|       } | |
|       adjust = 1 | |
|     } | |
|     copy_above_indices_for_final_run_flag | ae(v) |
|     palette_transpose_flag | ae(v) |
|   } | |

TABLE 1-continued

| | Descriptor |
|---|---|
| Syntax of palette coding | |

```
    if( treeType != DUAL_TREE_CHROMA &&
palette_escape_val_present_flag ) {
        if( cu_qp_delta_enabled flag && !IsCuQpDeltaCoded ) {
            cu_qp_delta_abs                                          ae(v)
            if( cu_qp_delta_abs )
                cu_qp_delta_sign flag                                ae(v)
        }
    }
    if( treeType != DUAL_TREE_LUMA &&
palette_escape_val_present_flag ) {
        if( cu_chroma_qp_offset_enabled_flag &&
!IsCuChromaQpOffsetCoded ) {
            cu_chroma_qp_offset_flag                                 ae(v)
            if( cu_chroma_qp_offset_flag )
                cu_chroma_qp_offset_idx                              ae(v)
        }
    }
    remainingNumIndices = num_palette_indices_minus1 + 1
    PaletteScanPos = 0
    log2CbWidth = Log2( cbWidth )
    log2CbHeight = Log2( cbHeight )
    while( PaletteScanPos < cbWidth*cbHeightt ) {
        xC =
x0 + TraverseScanOrder[ log2CbWidth ][ log2CbHeight ][ PaletteScanPos ]
[ 0 ]
        yC =
y0 + TraverseScanOrder[ log2CbWidth ][ log2CbHeight ][ PaletteScanPos ]
[ 1 ]
        if( PaletteScanPos > 0 ) {
            xcPrev =
x0 + TraverseScanOrder[ log2CbWidth ][ log2CbHeight ][ PaletteScanPos
− 1 ][ 0 ]
            ycPrev =
y0 + TraverseScanOrder[ log2CbWidth ][ log2CbHeight ][ PaletteScanPos
− 1 ][ 1 ]
        }
        PaletteRunMinus1 = cbWidth * cbHeight − PaletteScanPos − 1
        RunToEnd = 1
        CopyAboveIndicesFlag[ xC ][ yC ] = 0
        if( MaxPaletteIndex > 0 )
            if( ( ( !palette_transpose_flag && yC > 0 ) | | (
palette_transpose_flag && xC > 0 ) )
                && CopyAboveIndicesFlag[ xcPrev ][ ycPrev ] = = 0 )
                if( remainingNumIndices > 0 && PaletteScanPos < cbWidth*
cbHeight − 1 ) {
                    copy_above_palette_indices_flag                  ae(v)
                    CopyAboveIndicesFlag[ xC ][ yC ] =
copy_above_palette_indices_flag
                } else {
                    if( PaletteScanPos = = cbWidth * cbHeight − 1 &&
remainingNumIndices > 0 )
                        CopyAboveIndicesFlag[ xC ][ yC ] = 0
                    else
                        CopyAboveIndicesFlag[ xC ][ yC ] = 1
                }
        if ( CopyAboveIndicesFlag[ xC ][ yC ] = = 0 ) {
            currNumIndices = num_palette_indices_minus1 + 1 −
remainingNumIndices
            PaletteIndexMap[ xC ][ yC ] = PaletteIndexIdc[ currNumIndices ]
        }
        if( MaxPaletteIndex > 0 ) {
            if( CopyAboveIndicesFlag[ xC ][ yC ] = = 0 )
                remainingNumIndices − = 1
            if( remainingNumIndices > 0 | |
CopyAboveIndicesFlag[ xC ][ yC ] ! =
                copy_above_indices_for_final_run_flag ) {
                PaletteMaxRunMinus1 =
cbWidth * cbHeight − PaletteScanPos − 1 −
                    remainingNumIndices − copy_above_indices_for_final_run_flag
                RunToEnd = 0
                if( PaletteMaxRunMinus1 > 0 ) {
                    palette_run_prefix                               ae(v)
```

TABLE 1-continued

Syntax of palette coding

| | Descriptor |
|---|---|
| ```
          if( (palette_run_prefix > 1 ) && (PaletteMaxRunMinus1 !=
            ( 1 << ( palette_run_prefix - 1 ) ) ) )
            palette_run_suffix
        }
      }
    }
    runPos = 0
    while ( runPos <= PaletteRunMinus1 ) {
      xR = x0 + TraverseScanOrder[ log2CbWidth ][ log2CbHeight ][ PaletteScanPos ][ 0 ]
      yR = y0 + TraverseScanOrder[ log2CbWidth ][ log2CbHeight ][ PaletteScanPos ][ 1 ]
        if( CopyAboveIndicesFlag[ xC ][ yC ] = = 0 ) {
          Copy AboveIndicesFlag[ xR ][ yR ] = 0
          PaletteIndexMap[ xR ][ yR ] = PaletteIndexMap[ xC ][ yC ]
        } else {
          Copy AboveIndicesFlag[ xR ][ yR ] = 1
          if ( !palette_transpose_flag )
            PaletteIndexMap[ xR ][ yR ] = PaletteIndexMap[ xR ][ yR - 1 ]
          else
            PaletteIndexMap[ xR ][ yR ] = PaletteIndexMap[ xR - 1 ][ yR ]
        }
      runPos++
      PaletteScanPos ++
    }
  }
  if( palette_escape_val_present_flag ) {
    for( cIdx = startComp; cIdx < ( startComp + numComps ); cIdx++ )
      for( sPos = 0; sPos < cbWidth* cbHeight; sPos++ ) {
        xC = x0 + TraverseScanOrder[ log2CbWidth][ log2CbHeight ][ sPos ][ 0 ]
        yC = y0 + TraverseScanOrder[ log2CbWidth ][ log2CbHeight ][ sPos ][ 1 ]
        if( PaletteIndexMap[ cIdx ][ xC ][ yC ] = = MaxPaletteIndex )
        {
          palette_escape_val
          PaletteEscapeVal[ cIdx ][ xC ][ yC ] = palette_escape_val
        }
      }
  }
}
``` | ae(v)<br><br><br><br><br><br><br><br><br><br><br><br><br><br><br><br><br><br><br><br><br><br><br><br><br><br><br><br>ae(v) |

TABLE 2

Semantic of palette coding

In the following semantics, the array indices x0, y0 specify the location ( x0, y0 ) of the top-left luma sample of the considered coding block relative to the top-left luma sample of the picture. The array indices xC, yC specify the location ( xC, yC ) of the sample relative to the top-left luma sample of the picture. The array index startComp specifies the first color component of the current palette table. startComp equal to 0 indicates the Y component; startComp equal to 1 indicates the Cb component; startComp equal to 2 indicates the Cr component. numComps specifies the number of color components in the current palette table.
The palette predictor consists of palette entries from previous coding units that are used to predict the entries in the current palette. The variable PredictorPaletteSize[ startComp ] specifies the size of the palette predictor for the first color component of the current palette table startComp.
The variable PalettePredictorEntryReuseFlags[ i ] equal to 1 specifies that the i-th entry in the palette predictor is reused in the current palette. PalettePredictorEntryReuseFlags[ i ] equal to 0 specifies that the i-th entry in the palette predictor is not an entry in the current palette. All elements of the array PalettePredictorEntryReuseFlags[ i ] are initialized to 0. palette_predictor_run is used to determine the number of zeros that precede a non-zero entry in the array PalettePredictorEntryReuseFlags.
It is a requirement of bitstream conformance that the value of palette_predictor_run shall be in the range of 0 to ( PredictorPaletteSize − predictorEntryIdx ), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.

TABLE 2-continued

Semantic of palette coding num_signaled_palette_entries specifies the number of entries in the current palette that are explicitly signaled for the first color component of the current palette table startComp.
When num_signaled_palette_entries is not present, it is inferred to be equal to 0.
The variable CurrentPaletteSize[ startComp ] specifies the size of the current palette for the first color component of the current palette table startComp and is derived as follows:
    CurrentPaletteSize[ startComp ] = NumPredictedPaletteEntries +
    num_signaled_palette_entries
The value of CurrentPaletteSize[ startComp ] shall be in the range of 0 to palette_max_size, inclusive.
new_palette_entries[ cIdx ][ i ] specifies the value for the i-th signaled palette entry for the color component cIdx.
The variable PredictorPaletteEntries[ cIdx ][ i ] specifies the i-th element in the predictor palette for the color component cIdx.
The variable CurrentPaletteEntries[ cIdx ] [ i ] specifies the i-th element in the current palette for the color component cIdx and is derived as follows:
    numPredictedPaletteEntries = 0
      for( i = 0; i < PredictorPaletteSize[ startComp ]; i++ )
        if( PalettePredictorEntryReuseFlags[ i ] ) {
          for( cIdx =startComp; cIdx < ( startComp + numComps ); cIdx++ )
            CurrentPaletteEntries[ cIdx ][ numPredictedPaletteEntries ] =
    PredictorPaletteEntries[ cIdx ][ i ]
        numPredictedPaletteEntries++
      }
    for( cIdx = startComp; cIdx < (startComp + numComps); cIdx++)
      for( i = 0; i < num_signaled_palette_entries[startComp]; i++ )
        CurrentPaletteEntries[ cIdx ][ numPredictedPaletteEntries + i ] =
    new_palette_entries[ cIdx ][ i ]
palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.
The variable MaxPaletteIndex specifies the maximum possible value for a palette index for the current coding unit. The value of MaxPaletteIndex is set equal to CurrentPaletteSize[ startComp ] − 1 + palette_escape_val_present_flag.
num_palette_indices_minus1 plus 1 is the number of palette indices explicitly signaled or inferred for the current block.
When num_palette_indices_minus1 is not present, it is inferred to be equal to 0.
palette_idx_idc is an indication of an index to the palette table, CurrentPaletteEntries. The value of palette_idx_idc shall be in the range of 0 to MaxPaletteIndex, inclusive, for the first index in the block and in the range of 0 to ( MaxPaletteIndex − 1 ), inclusive, for the remaining indices in the block.
When palette_idx_idc is not present, it is inferred to be equal to 0.
The variable PaletteIndexIdc[ i ] stores the i-th palette_idx_idc explicitly signaled or inferred. All elements of the array PaletteIndexIdc[ i ] are initialized to 0.
copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[ num_palette_indices_minus1 ].
When copy_above_indices_for_final_run_flag is not present, it is inferred to be equal to 0.
palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.
The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if palette_transpose_flag is equal to 1.
copy_above_palette_indices_flag equal to 1 specifies that the palette index is equal to the palette index at the same location in the row above if horizontal traverse scan is used or the same location in the left column if vertical traverse scan is used.
copy_above_palette_indices_flag equal to 0 specifies that an indication of the palette index of the sample is coded in the bitstream or inferred.
The variable CopyAboveIndicesFla[ xC ][ yC ] equal to 1 specifies that the palette index is copied from the palette index in the row above (horizontal scan) or left column (vertical scan). CopyAboveIndicesFlag[ xC ][ yC ] equal to 0 specifies that the palette index is explicitly coded in the bitstream or inferred. The array indices xC, yC specify the location ( xC, yC ) of the sample relative to the top-left luma sample of the picture. The value of PaletteIndexMap[ xC ][ yC ] shall be in the range of 0 to ( MaxPaletteIndex − 1), inclusive.
The variable PaletteIndexMap[ xC ][ yC ] specifies a palette index, which is an index to the array represented by CurrentPaletteEntries. The array indices xC, yC specify the location ( xC, yC ) of the sample relative to the top-left luma sample of the picture. The value of PaletteIndexMap[ xC ][ yC ] shall be in the range of 0 to MaxPaletteIndex, inclusive.

TABLE 2-continued

Semantic of palette coding

The variable adjustedRefPaletteIndex is derived as follows:
   adjustedRefPaletteIndex = MaxPaletteIndex + 1
   if( PaletteScanPos > 0 ) {
     xcPrev =
  x0 + TraverseScanOrder[ log2CbWidth ][ log2bHeight ][ PaletteScanPos − 1 ][ 0 ]
     ycPrev =
  y0 + TraverseScanOrder[ log2CbWidth ][ log2bHeight ][ PaletteScanPos − 1 ][ 1 ]
     if( CopyAboveIndicesFlag[ xcPrev ][ ycPrev ] = = 0 ) {
       adjustedRefPaletteIndex = PaletteIndexMap[ xcPrev ][ ycPrev ] {
     }
     else {
       if( !palette_transpose_flag )
         adjustedRefPaletteIndex = PaletteIndexMap[ xC ][ yC − 1 ]
       else
         adjustedRefPaletteIndex = PaletteIndexMap[ xC − 1 ][ yC ]
     }
   }
When CopyAboveIndicesFlag[ xC ][ yC ] is equal to 0, the variable CurrPaletteIndex is
derived as follows:
   if( CurrPaletteIndex >= adjustedRefPaletteIndex )
     CurrPaletteIndex++
palette_run_prefix, when present, specifies the prefix part in the binarization of
PaletteRunMinus 1.
palette_run_suffix is used in the derivation of the variable PaletteRunMinus1. When not
present, the value of palette_run_suffix is inferred to be equal to 0.
When RunToEnd is equal to 0, the variable PaletteRunMinus1 is derived as follows:

− If PaletteMaxRunMinus1 is equal to 0, PaletteRunMinus1 is set equal to 0.
− Otherwise (PaletteMaxRunMinus1 is greater than 0) the following applies:
  − If palette_run_prefix is less than 2, the following applies:
     PaletteRunMinus1                           =         palette_run_prefix
  − Otherwise (palette_run_prefix is greater than or equal to 2), the following applies:
     PrefixOffset = 1 << ( palette_run_prefix − 1 )
     PaletteRunMinus1 = PrefixOffset + palette_run_suffix
The variable PaletteRunMinus1 is used as follows:
− If CopyAboveIndicesFlag[ xC ][ yC ] is equal to 0, PaletteRunMinus1 specifies the
  number of consecutive locations minus 1 with the same palette index.
− Otherwise if palette_transpose_flag equal to 0, PaletteRunMinus1 specifies the number
  of consecutive locations minus 1 with the same palette index as used in the corresponding
  position in the row above.
− Otherwise, PaletteRunMinus1 specifies the number of consecutive locations minus 1
  with the same palette index as used in the corresponding position in the left column.
When RunToEnd is equal to 0, the variable PaletteMaxRunMinus1 represents the maximum
possible value for PaletteRunMinus1 and it is a requirement of bitstream conformance that
the value of PaletteMaxRunMinus1 shall be greater than or equal to 0.
palette_escape_val specifies the quantized escape coded sample value for a component.
The variable PaletteEscapeVal[ cIdx ][ xC ][ yC ] specifies the escape value of a sample for
which PaletteIndexMap[ xC ][ yC ] is equal to MaxPaletteIndex and
palette_escape_val_present_flag is equal to 1. The array index cIdx specifies the color
component. The array indices xC, yC specify the location ( xC, yC ) of the sample relative
to the top-left luma sample of the picture.
It is a requirement of bitstream conformance that PaletteEscapeVal[ cIdx ][ xC ][ yC ] shall
be in the range of 0 to (1 << ( $BitDepth_Y$ + 1 ) ) − 1, inclusive, for cIdx equal to 0, and in
the range of 0 to (1 << ( $BitDepth_C$ + 1 ) ) − 1, inclusive, for cIdx not equal to 0.

TABLE 3

The binary codeword and the CABAC context selection for the syntax
palette_run_prefix The binary codeword of palette_run_prefix is derived through the truncated rice
binarization process as described below with the input parameters cMax =
Floor( Log2( PaletteMaxRunsMinus 1 ) ) + 1, cRiceParam = 0.
Truncated Rice binarization process
Input to this process is a request for a truncated Rice (TR) binarization, cMax and
cRiceParam.
Output of this process is the TR binarization associating each value symbolVal with a
corresponding bin string.
A TR bin string is a concatenation of a prefix bin string and, when present, a suffix bin
string.
For the derivation of the prefix bin string, the following applies:
The prefix value of symbolVal, prefixVal, is derived as follows:
prefix Val = symbolVal >> cRiceParam TABLE 3-continued The binary codeword and the CABAC context selection for the syntax palette_run_prefix The prefix of the TR bin string is specified as follows:
If prefix Val is less than cMax >> cRiceParam, the prefix bin string is a bit string of
length prefixVal + 1 indexed by binIdx. The bins for binIdx less than prefix Val are
equal to 1. The bin with binIdx equal to prefixVal is equal to 0. Table 3-1 below
illustrates the bin strings of this unary binarization for prefix Val.
Otherwise, the bin string is a bit string of length cMax >> cRiceParam with all bins
being equal to 1.

Table 3-1 - Bin string of the unary binarization (informative)

| prefix Val | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

When cMax is greater than symbolVal and cRiceParam is greater than 0, the suffix of the
TR bin string is present and it is derived as follows:
The suffix value suffixVal is derived as follows:
suffixVal = symbolVal − ( ( prefixVal ) << cRiceParam )
The suffix of the TR bin string is specified by invoking the fixed-length (FL) binarization
process as specified in the VVC specification for suffix Val with a cMax value equal to
(1 << cRiceParam ) − 1.
NOTE - For the input parameter cRiceParam = 0, the TR binarization is exactly a
truncated unary binarization and it is always invoked with a cMax value equal to the
largest possible value of the syntax element being decoded.
Derivation process of ctxInc for the syntax element palette_run_prefix
Inputs to this process are the bin index binIdx and the syntax elements
copy_above_palette_indices_flag and palette_idx_idc.
Output of this process is the variable ctxInc.
The variable ctxInc is derived as follows:
If copy_above_palette_indices_flag is equal to 0 and binIdx is equal to 0, ctxInc is
derived as follows:
ctxInc = ( palette_idx_idc < 1 ) ? 0 : ( ( palette_idx_idc < 3 ) ? 1 : 2 )
Otherwise, ctxInc is provided by Table 3-2:

Table 3-2 - Specification of ctxIdxMap[ copy_above_palette_indices_flag ][ binIdx ]

| binIdx | 0 | 1 | 2 | 3 | 4 | >4 |
|---|---|---|---|---|---|---|
| copy_above_a_palete_indices_flag = = 1 | 5 | 6 | 6 | 7 | 7 | bypass |
| copy_above_a_palete_indices_flag = = 1 | 0, 1, 2 | 3 | 3 | 4 | 4 | bypass |

Figure 5D:
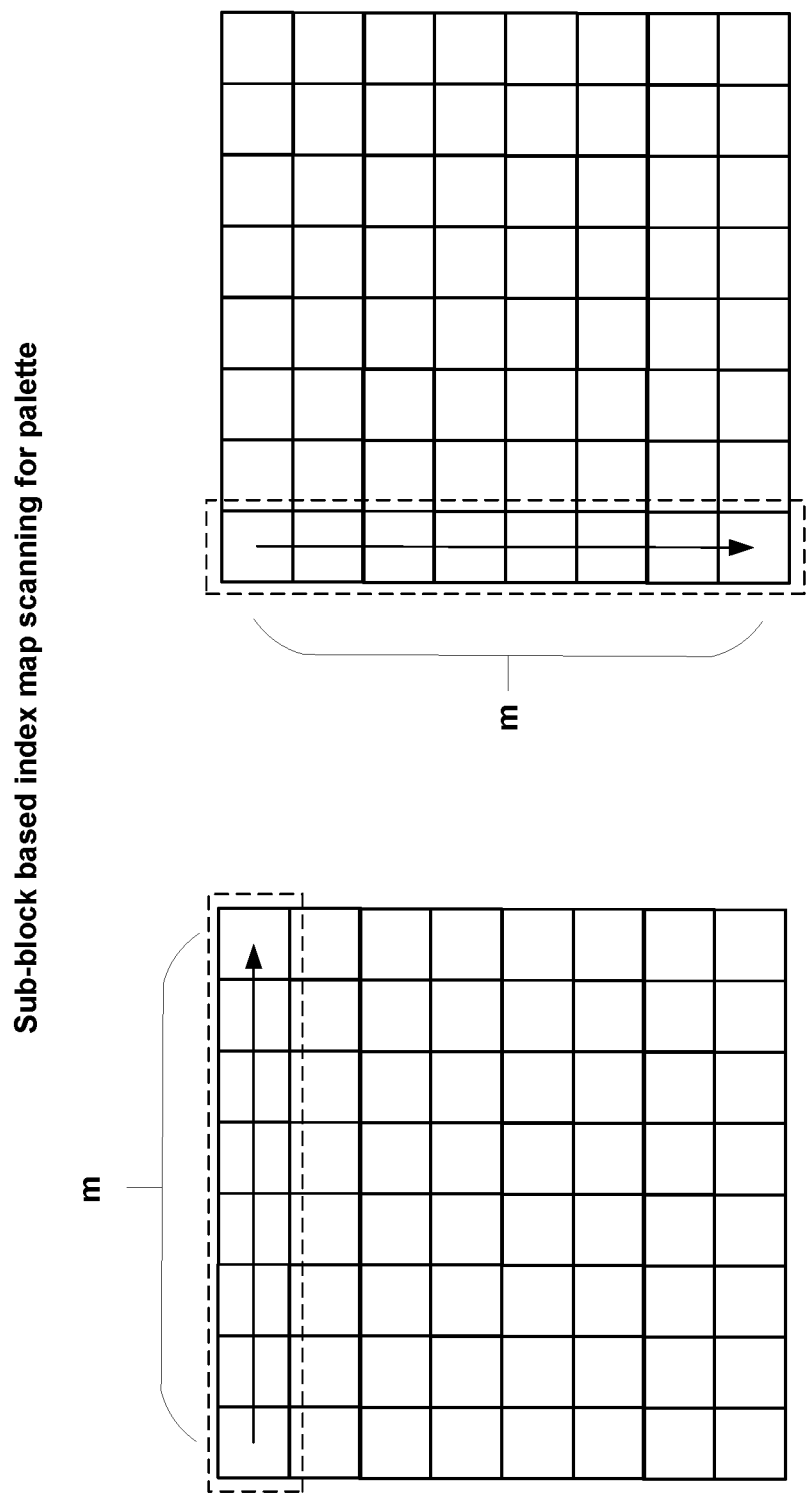

In the 15$^{th}$ JVET meeting, a line-based CG is proposed (the document number is JVET-O0120 and can be accessed in http://phenix.int-evry.fr/jvet/) to simplify the buffer usage and syntax in the palette mode in VTM6.0. As the coefficient group (CG) used in transform coefficient coding, a CU is divided into multiple line-based coefficient group, each consists of m samples, where index runs, palette index values, and quantized colors for escape mode are encoded/parsed sequentially for each CG. As a result, pixels in a line-based CG can be reconstructed after parsing the syntax elements, e.g., index runs, palette index values, and escape quantized colors for the CG, which highly reduce the buffer requirement in the palette mode in VTM6.0, where the syntax elements for the whole CU have to be parsed (and stored) before reconstruction In this application, each CU of palette mode is divided into multiple segments of m samples (m=8 in this test) based on the traverse scan mode, as shown in FIG. 5D.

The encoding order for palette run coding in each segment is as follows: For each pixel, one context coded bin run_copy_flag=0 is signaled indicating that the pixel is of the same mode as the previous pixel, i.e., the previous scanned pixel and the current pixel are both of run type COPY_ABOVE or the previous scanned pixel and the current pixel are both of run type INDEX and the same index value. Otherwise, run_copy_flag=1 is signaled.

If the current pixel and the previous pixel are of different mode, one context coded bin copy_above_palette_indices_flag is signaled indicating the run type, i.e., INDEX or COPY_ABOVE, of the pixel. In this case, the decoder does not have to parse run type if the sample is in the first row (horizontal traverse scan) or in the first column (vertical traverse scan) since the INDEX mode is used by default. Nor does the decoder have to parse run type if the previously parsed run type is COPY_ABOVE.

After palette run coding of pixels in one segment, the index values (for INDEX mode) and quantized escape colors are coded as bypass bins and grouped apart from encoding/parsing of context coded bins to improve throughput within each line-based CG. Since the index value is now coded/parsed after run coding, encoder does not have to signal the number of index values num_palette_indices_minus1 and the last run type copy_above_indices_for_final_run_flag. The syntax of the CG palette mode is illustrated in Table 4.

TABLE 4

| Syntax of palette coding | |
| --- | --- |
| | Descriptor |

```
palette_coding( x0, y0, cbWidth, cbHeight, startComp, numComps ) {
    palettePredictionFinished = 0
    NumPredictedPaletteEntries = 0
    for( predictorEntryIdx = 0; predictorEntryIdx <
PredictorPaletteSize[ startComp ] &&
        !palettePredictionFinished &&
        NumPredictedPaletteEntries[ startComp ] <
palette_max_size; predictorEntryIdx++ ) {
        palette_predictor_run                                               ae(v)
        if( palette_predictor_run != 1 ) {
            if( palette_predictor_run > 1 )
                predictorEntryIdx += palette_predictor_run − 1
            PalettePredictorEntryReuseFlags[ predictorEntryIdx ] = 1
            NumPredictedPaletteEntries++
        } else
            palettePredictionFinished = 1
    }
    if( NumPredictedPaletteEntries < palette_max_size )
        num_signaled_palette_entries                                        ae(v)
    for( cIdx = startComp; cIdx < ( startComp + numComps); cIdx++ )
        for( i = 0; i < num_signaled_palette_entries; i++ )
            new_palette_entries[ cIdx ][ i ]                                ae(v)
    if( CurrentPaletteSize[ startComp ] > 0 )
        palette_escape_val_present_flag                                     ae(v)
    if( MaxPaletteIndex > 0 ) {
        adjust = 0
        palette_transpose_flag                                              ae(v)
    }
    if( treeType != DUAL_TREE_CHROMA &&
palette_escape_val_present_flag ) {
        if( cu_qp_delta_enabled_flag && !IsCuQpDeltaCoded ) {
            cu_qp_delta_abs                                                 ae(v)
            if( cu_qp_delta_abs )
                cu_qp_delta_sign_flag                                       ae(v)
        }
    }
    if( treeType != DUAL_TREE_LUMA &&
palette_escape_val_present_flag ) {
        if( cu_chroma_qp_offset_enabled_flag &&
!IsCuChromaQpOffsetCoded ) {
            cu_chroma_qp_offset_flag                                        ae(v)
            if( cu_chroma_qp_offset_flag )
                cu_chroma_qp_offset_idx                                     ae(v)
        }
    }
    PreviousRunTypePosition = 0
    PreviousRunType = 0
    for (subSetId = 0; subSetId <= (cbWidth* cbHeight − 1) >> 4; subSetId++) {
        minSubPos = subSetId << 4
        if( minSubPos + 16 > cbWidth * cbHeight)
            maxSubPos = cbWidth * cbHeight
        else
            maxSubPos = minSubPos + 16
        RunCopyMap[ 0 ][ 0 ] = 0
        log2CbWidth = Log2( cbWidth )
        log2CbHeight = Log2( cbHeight )
        PaletteScanPos = minSubPos
        while( PaletteScanPos < maxSubPos ) {
            xC =
x0 + TraverseScanOrder[ log2CbWidth ][ log2CbHeight ][ PaletteScanPos ][ 0
]
            yC =
y0 + TraverseScanOrder[ log2CbWidth ][ log2CbHeight ][ PaletteScanPos ][ 1
]
            if( PaletteScanPos > 0 ) {
                xcPrev =
x0 + TraverseScanOrder[ log2CbWidth ][ log2CbHeight ][ PaletteScanPos − 1
][0]
                ycPrev =
y0 + TraverseScanOrder log2CbWidth ][ log2CbHeight ][ PaletteScanPos − 1
][ 1 ]
            }
```

TABLE 4-continued

Syntax of palette coding

| | Descriptor |
|---|---|
|       if ( MaxPaletteIndex > 0 && PaletteScanPos > 0) { | |
|         run_copy_flag | ae(v) |
|         RunCopyMap[ xC ][ yC ] = run_copy_flag | |
|       } | |
|       CopyAboveIndicesFlag[ xC ][ yC ] = 0 | |
|       if( MaxPaletteIndex > 0 && ! RunCopyMap[startComp][xC][yC] ) { | |
|         if( ( ( !palette_transpose_flag && yC > 0 ) \|\| ( palette_transpose_flag && xC > 0 ) ) | |
|         && CopyAboveIndicesFlag[ xcPrev ][ycPrev] == 0 ){ | |
|           copy_above_palette_indices_flag | ae(v) |
|           CopyAboveIndicesFlag[ xC ][ yC ] = copy_above_palette_indices_flag | |
|         } | |
|         PreviousRunType = CopyAboveIndicesFlag[ xC ][ yC ] | |
|         PreviousRunTypePosition = curPos | |
|       } else { | |
|         CopyAboveIndicesFlag[ xC ][ yC ] = CopyAboveIndicesFlag[xcPrev][ ycPrev] | |
|       } | |
|     } | |
|     PaletteScanPos ++ | |
|   } | |
|   PaletteScanPos = minSubPos | |
|   while( PaletteScanPos < maxSubPos ) { | |
|     xC = x0 + TraverseScanOrder[ log2CbWidth ][ log2CbHeight ][ PaletteScanPos ][ 0 ] | |
|     yC = y0 + TraverseScanOrder[ log2CbWidth ][ log2CbHeight ][ PaletteScanPos ][ 1 ] | |
|     if( PaletteScanPos > 0 ) { | |
|       xcPrev = x0 + TraverseScanOrder[ log2CbWidth ][ log2CbHeight ][ PaletteScanPos − 1 ][0] | |
|       ycPrev = y0 + TraverseScanOrder log2CbWidth ][ log2CbHeight ][ PaletteScanPos − 1 ][ 1 ] | |
|     } | |
|     if ( MaxPaletteIndex > 0 ) { | |
|       if ( ! RunCopyMap [ x C][ yC ] && CopyAboveIndicesFlag[ xC ][ yC ] = = 0 ) { | |
|         if( MaxPaletteIndex − adjust > 0 ) { | |
|           palette_idx_idc | ae(v) |
|         } | |
|         adjust = 1 | |
|       } | |
|     } | |
|     if ( ! RunCopyMap [ xC][ yC ] && CopyAboveIndicesFlag[ xC ][ yC ] = = 0 ) { | |
|       CurrPaletteIndex = palette_idx_idc | |
|     if( CopyAboveIndicesFlag[ xC ][ yC ] = = 0 ) { | |
|       PaletteIndexMap[ xC ][ yC ] = CurrPaletteIndex | |
|     } else { | |
|       if ( !palette_transpose_flag ) | |
|         PaletteIndexMap[ xC ][ yC ] = PaletteIndexMap[ xC ][ yC − 1 ] | |
|       else | |
|         PaletteIndexMap[ xC ][ yC ] = PaletteIndexMap[ xC − 1 ][ yC ] | |
|     } | |
|   } | |
|   if( palette_escape_val_present_flag ) { | |
|     for( cIdx = startComp; cIdx < ( startComp + numComps ); cIdx++ ) | |
|       for( sPos = minSubPos ; sPos < maxSubPos; sPos++ ) { | |
|         xC = x0 + TraverseScanOrder[ log2CbWidth][ log2CbHeight ][ sPos ][ 0 ] | |
|         yC = y0 + TraverseScanOrder[ log2CbWidth][ log2CbHeight ][ sPos ][ 1 ] | |
|         if( PaletteIndexMap[ cIdx ][ xC ][ yC ] = = MaxPaletteIndex ) { | |
|           palette_escape_val | ae(v) |
|           PaletteEscapeVal[ cIdx ][ xC ][ yC ] = palette_escape_val | |
|         } | |
|       } | |
|   } | |
| } | |

FIG. 6 is a flowchart 600 illustrating an exemplary process by which a video decoder (e.g., video decoder 30) implements the techniques of decoding video data in accordance with some implementations of the present disclosure.

For the palette mode in the VVC, palette mode can apply for CU that are equal or smaller than 64×64 pixels. In some embodiments, a minimum palette mode block size is proposed to reduce the complexity such that the palette mode is disabled for coding units whose size is smaller than the minimum palette mode block size. For example, it is proposed to disable the palette mode for all the blocks with a size smaller than a certain threshold, e.g. 16 samples. Because there are different chroma formats (e.g., 4:4:4, 4:2:2, 4:2:0) and different coding tree types (e.g., SINGLE_TREE, DUAL_TREE_LUMA and DUAL_TREE_CHROMA), this threshold may vary. Note that "SINGLE_TREE" indicates that the luma and chroma components of an image are partitioned in the same way such that these two components share the same palette table and palette predictor under the palette mode. In contrast, "DUAL_TREE" indicates that the luma and chroma components of an image are partitioned separately such that these two components have different palette tables and palette predictors under the palette mode. For example, for the YUV 4:2:0 format with "DUAL_TREE" type, i.e., the different components considered separately, the palette mode for the chroma component of the CU that are smaller to 16 samples should be disabled to reduce the complexity. The following table 5 gives one example of the proposed syntax.

width of the luma array. In 4:4:4 sampling, each of the two chroma arrays has the same height and width as the luma array.

In another embodiment, for single-tree cases, the palette mode is disabled for small-size block depending on the luma block size. In one example for YUV 420 format, the palette mode for CU that are smaller to 16 pixels depended on luma block size is disabled on single-tree cases. In one specific example, palette mode can be enabled for an 8×4 CU which contains 8×4 luma samples and two 4×2 chroma samples since the palette enabling is conditioned on the size of luma samples disregarding the chroma size.

During the decoding of a bitstream, the video decoder 30 first receives, from the bitstream, a plurality of syntax elements associated with a coding unit (610). The plurality of syntax elements indicate a size of the coding unit and a coding tree type of the coding unit. For example, the coding tree type of the coding unit may be one of SINGLE_TREE, DUAL_TREE_LUMA or DUAL_TREE_CHROMA. The video decoder 30 then determines a minimum palette mode block size for the coding unit in accordance with the coding tree type of the coding unit (620). For example, as depicted in Table 5 above, when the coding tree type of the coding unit is SINGLE_TREE or DUAL_TREE_LUMA, the video decoder 30 sets the minimum palette mode block size to be 16 samples. When the coding tree type of the coding unit is DUAL_TREE_CHROMA, the video decoder 30 first determines a chroma format for the coding unit and then sets the minimum palette mode block size in accordance with the

TABLE 5

Palette Mode Enable Flag Under Different Coding Tree Types and Chroma formats

| | Descriptor |
|---|---|
| coding_unit( x0, y0, cbWidth, cbHeight, cqtDepth, treeType, modeType ) { | |
| ... | |
|   if( CuPredMode[ chType ][ x0 ][ y0 ] = = MODE_INTRA && sps_palette_enabled_flag && | |
|     cbWidth <= 64 && cbHeight <= 64 && cu_skip_flag[ x0 ][ y0 ] = = 0 && | |
|     modeType != MODE_TYPE_INTER && (cbWidth* cbHeight > (treeType != DUAL_TREE_CHROMA? 16:16* SubWidthC* SubHeightC)) ) | |
|       pred_mode_plt_flag | u(1) |
|   } | |
| ... | |
| } | |

In Table 5, pred_mode_plt_flag specifies whether the palette mode is enabled (e.g., a value of 1) or disabled (e.g., a value of 0) for the coding unit. Parameters like SubWidthC and SubHeightC are associated with the chroma format of the coding unit as follows:

| Chroma format | SubWidthC | SubHeightC |
|---|---|---|
| Monochrome | 1 | 1 |
| 4:4:4 | 1 | 1 |
| 4:2:2 | 2 | 1 |
| 4:2:0 | 2 | 2 |

In monochrome sampling, there is only one sample array, which is nominally considered the luma array. In 4:2:0 sampling, each of the two chroma arrays has half the height and half the width of the luma array. In 4:2:2 sampling, each of the two chroma arrays has the same height and half the chroma format as illustrated in the table above. For example, when the chroma format is 4:4:4, the minimum palette mode block size is 16 samples; when the chroma format is 4:2:2, the minimum palette mode block size is 32 samples; and when the chroma format is 4:2:0, the minimum palette mode block size is 64 samples.

In accordance with a determination that the size of the coding unit is greater than the minimum palette mode block size (630), the video decoder 30 receives, from the bitstream, a palette mode enable flag associated with the coding unit (640) and then decodes, from the bitstream, the coding unit in accordance with the palette mode enable flag (650). In some embodiments, when the palette mode enable flag indicates that palette mode is enabled for the coding unit, the video decoder 30 generates, from the bitstream, a palette table for the current unit (670) and then decodes, from the bitstream, the coding unit using the generated palette table (680) as described above in connection with FIGS. 5A to 5D.

Figure 7:
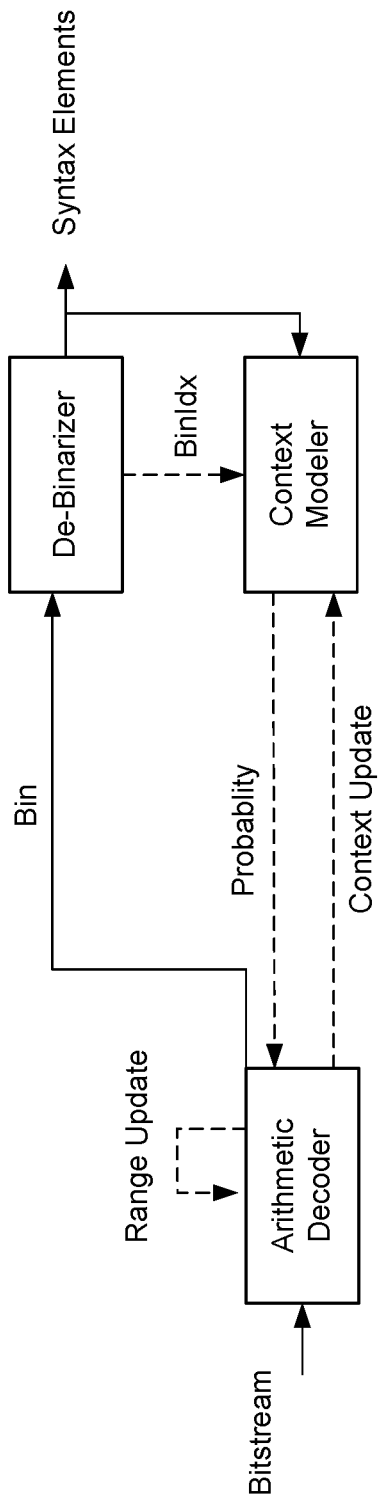
FIG. 7 is a block diagram illustrating an example Context-adaptive binary arithmetic coding (CABAC) engine in accordance with some implementations of the present disclosure.

FIG. 7 is a block diagram illustrating an exemplary context-adaptive binary arithmetic coding (CABAC) engine in accordance with some implementations of the present disclosure.

Context-adaptive binary arithmetic coding (CABAC) is a form of entropy coding used in many video coding standards, e.g. H.264/MPEG-4 AVC, High Efficiency Video Coding (HEVC) and VVC. CABAC is based on arithmetic coding, with a few innovations and changes to adapt it to the needs of video coding standards. For example, CABAC codes binary symbols, which keeps the complexity low and allows probability modelling for more frequently used bits of any symbol. Probability models are selected adaptively based on local context, allowing better modelling of probabilities, because coding modes are usually locally well correlated. Finally, CABAC uses a multiplication-free range division by the use of quantized probability ranges and probability states.

CABAC has multiple probability modes for different contexts. It first converts all non-binary symbols to binary. Then, for each bin (or termed bit), the coder selects which probability model to use, then uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode. Coding a data symbol involves the following stages.

Binarization: CABAC uses Binary Arithmetic Coding which means that only binary decisions (1 or 0) are encoded. A non-binary-valued symbol (e.g. a transform coefficient or motion vector) is "binarized" or converted into a binary code prior to arithmetic coding. This process is similar to the process of converting a data symbol into a variable length code but the binary code is further encoded (by the arithmetic coder) prior to transmission. Stages are repeated for each bin (or "bit") of the binarized symbol.

Context model selection: A "context model" is a probability model for one or more bins of the binarized symbol. This model may be chosen from a selection of available models depending on the statistics of recently coded data symbols. The context model stores the probability of each bin being "1" or "0".

Arithmetic encoding: An arithmetic coder encodes each bin according to the selected probability model. Note that there are just two sub-ranges for each bin (corresponding to "0" and "1").

Probability update: The selected context model is updated based on the actual coded value (e.g. if the bin value was "1", the frequency count of "1"s is increased).

By decomposing each non-binary syntax element value into a sequence of bins, further processing of each bin value in CABAC depends on the associated coding-mode decision, which can be either chosen as the regular or the bypass mode. The latter is chosen for bins, which are assumed to be uniformly distributed and for which, consequently, the whole regular binary arithmetic encoding (and decoding) process is simply bypassed. In the regular coding mode, each bin value is encoded by using the regular binary arithmetic coding engine, where the associated probability model is either determined by a fixed choice, based on the type of syntax element and the bin position or bin index (binIdx) in the binarized representation of the syntax element, or adaptively chosen from two or more probability models depending on the related side information (e.g. spatial neighbors, component, depth or size of CU/PU/TU, or position within TU). Selection of the probability model is referred to as context modeling. As an important design decision, the latter case is generally applied to the most frequently observed bins only, whereas the other, usually less frequently observed bins, will be treated using a joint, typically zero-order probability model. In this way, CABAC enables selective adaptive probability modeling on a sub-symbol level, and hence, provides an efficient instrument for exploiting inter-symbol redundancies at significantly reduced overall modeling or learning costs. Note that for both the fixed and the adaptive case, in principle, a switch from one probability model to another can occur between any two consecutive regular coded bins. In general, the design of context models in CABAC reflects the aim to find a good compromise between the conflicting objectives of avoiding unnecessary modeling-cost overhead and exploiting the statistical dependencies to a large extent.

The parameters of probability models in CABAC are adaptive, which means that an adaptation of the model probabilities to the statistical variations of the source of bins is performed on a bin-by-bin basis in a backward-adaptive and synchronized fashion both in the encoder and decoder; this process is called probability estimation. For that purpose, each probability model in CABAC can take one out of 126 different states with associated model probability values p ranging in the interval [0:01875; 0:98125]. The two parameters of each probability model are stored as 7-bit entries in a context memory: 6 bits for each of the 63 probability states representing the model probability pLPS of the least probable symbol (LPS) and 1 bit for nMPS, the value of the most probable symbol (MPS).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, comprising:
deriving a plurality of variables associated with a coding unit, wherein the plurality of variables indicate a luma coding block size and a coding tree type;
determining a palette mode block size threshold for the coding unit in accordance with the coding tree type;
at least in accordance with a determination that the luma coding block size is greater than the palette mode block size threshold:
receiving, from a bitstream, a palette mode enable flag associated with the coding unit; and
decoding, from the bitstream, the coding unit in accordance with the palette mode enable flag.

2. The method according to claim 1, wherein the decoding, from the bitstream, the coding unit in accordance with the palette mode enable flag comprises:
when the palette mode enable flag indicates that a palette mode is enabled for the coding unit:
generating, from the bitstream, a palette table for the coding unit; and
decoding, from the bitstream, the coding unit using the generated palette table.

3. The method according to claim 1, wherein the determining a palette mode block size threshold for the coding unit in accordance with the coding tree type comprises:
when the coding tree type is SINGLE TREE or DUAL TREE LUMA:
setting the palette mode block size threshold to be 16; and
when the coding tree type is DUAL TREE CHROMA:
setting the palette mode block size threshold in accordance with a chroma format.

4. The method according to claim 3, wherein, when the chroma format is 4:4:4, the palette mode block size threshold is 16.

5. The method according to claim 3, wherein, when the chroma format is 4:2:2, the palette mode block size threshold is 32.

6. The method according to claim 3, wherein, when the chroma format is 4:2:0, the palette mode block size threshold is 64.

7. An electronic apparatus comprising:
one or more processing units;
memory coupled to the one or more processing units; and
a plurality of programs stored in the memory that, when executed by the one or more processing units, cause the electronic apparatus to perform a method of decoding video data including:
deriving a plurality of variables associated with a coding unit, wherein the plurality of variables indicate a luma coding block size and a coding tree type;
determining a palette mode block size threshold for the coding unit in accordance with the coding tree type;
at least in accordance with a determination that the luma coding block size is greater than the palette mode block size threshold:
receiving, from a bitstream, a palette mode enable flag associated with the coding unit; and
decoding, from the bitstream, the coding unit in accordance with the palette mode enable flag.

8. The electronic apparatus according to claim 7, wherein the decoding, from the bitstream, the coding unit in accordance with the palette mode enable flag comprises:
when the palette mode enable flag indicates that a palette mode is enabled for the coding unit:
generating, from the bitstream, a palette table for the coding unit; and
decoding, from the bitstream, the coding unit using the generated palette table.

9. The electronic apparatus according to claim 7, wherein the determining a palette mode block size threshold for the coding unit in accordance with the coding tree type comprises:
when the coding tree type is SINGLE TREE or DUAL TREE LUMA:
setting the palette mode block size threshold to be 16; and
when the coding tree type is DUAL TREE CHROMA:
setting the palette mode block size threshold in accordance with a chroma format.

10. The electronic apparatus according to claim 9, wherein, when the chroma format is 4:4:4, the palette mode block size threshold is 16.

11. The electronic apparatus according to claim 9, wherein, when the chroma format is 4:2:2, the palette mode block size threshold is 32.

12. The electronic apparatus according to claim 9, wherein, when the chroma format is 4:2:0, the palette mode block size threshold is 64.

13. A non-transitory computer readable storage medium storing a plurality of programs for execution by an electronic apparatus having one or more processing units, wherein the plurality of programs, when executed by the one or more processing units, cause the electronic apparatus to perform a method of decoding video data including:
deriving a plurality of variables associated with a coding unit, wherein the plurality of variables indicate a luma coding block size and a coding tree type;
determining a palette mode block size threshold for the coding unit in accordance with the coding tree type;

at least in accordance with a determination that the luma coding block size is greater than the palette mode block size threshold:
receiving, from a bitstream, a palette mode enable flag associated with the coding unit; and
decoding, from the bitstream, the coding unit in accordance with the palette mode enable flag.

14. The non-transitory computer readable storage medium according to claim 13, wherein the decoding, from the bitstream, the coding unit in accordance with the palette mode enable flag comprises:
when the palette mode enable flag indicates that a palette mode is enabled for the coding unit:
generating, from the bitstream, a palette table for the coding unit; and
decoding, from the bitstream, the coding unit using the generated palette table.

15. The non-transitory computer readable storage medium according to claim 13, wherein the determining a palette mode block size threshold for the coding unit in accordance with the coding tree type comprises:
when the coding tree type is SINGLE TREE or DUAL TREE LUMA:
setting the palette mode block size threshold to be 16; and
when the coding tree type is DUAL TREE CHROMA:
determining a chroma format for the coding unit; and
setting the palette mode block size threshold in accordance with a chroma format.

16. The non-transitory computer readable storage medium according to claim 15, wherein, when the chroma format is 4:4:4, the palette mode block size threshold is 16.

17. The non-transitory computer readable storage medium according to claim 15, wherein, when the chroma format is 4:2:2, the palette mode block size threshold is 32.

18. The non-transitory computer readable storage medium according to claim 15, wherein, when the chroma format is 4:2:0, the palette mode block size threshold is 64.

* * * * *